No. 726,829. PATENTED APR. 28, 1903.
J. F. SCHWEIGERER.
COUPLING PIN.
APPLICATION FILED JAN. 31, 1902.
NO MODEL.
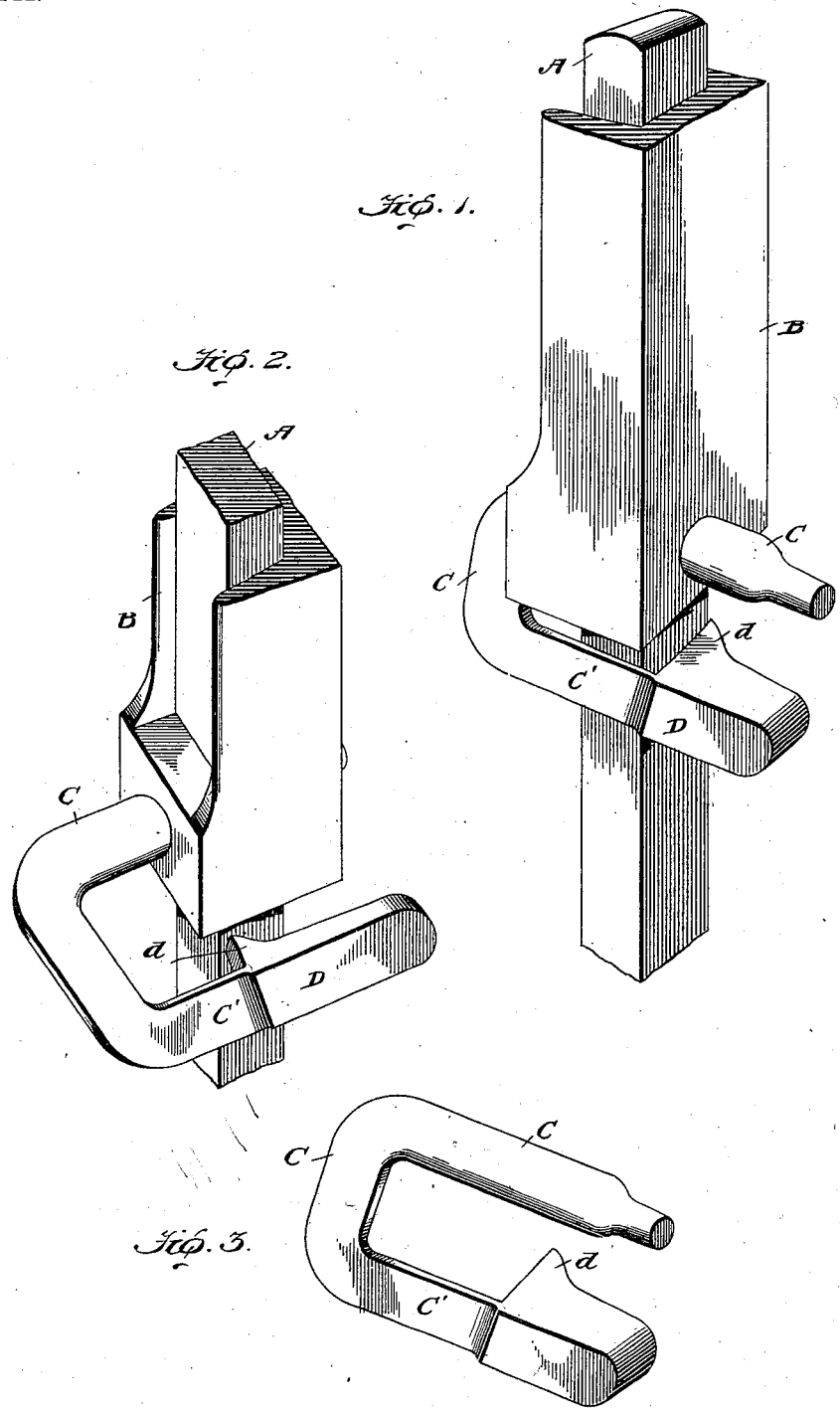
Witnesses
Inventor
John F. Schweigerer
by Henry N. Copp
his Attorney

UNITED STATES PATENT OFFICE.

JOHN F. SCHWEIGERER, OF CAMDEN, INDIANA.

COUPLING-PIN.

SPECIFICATION forming part of Letters Patent No. 726,829, dated April 28, 1903.

Application filed January 31, 1902. Serial No. 92,080. (No model.)

*To all whom it may concern:*

Be it known that I, JOHN F. SCHWEIGERER, a citizen of the United States, residing at Camden, in the county of Carroll and State of Indiana, have invented a new and useful Coupling-Pin, of which the following is a specification.

This invention relates to couplings for windmill pump-rods.

The object of the present invention is to provide a simple, inexpensive, and durable coupling for windmill pump-rods, though adaptable for use on rods of any kind, which will be self-locking, and more particularly one which will automatically lock itself and remain locked by gravity.

Having the foregoing object in view, the invention consists of a self-locking coupling of the class described, one form assumed by the invention being such as shown in the accompanying drawings, described in the following specification, and set forth in the appended claims.

In the accompanying drawings, Figure 1 is a perspective view of the invention when in use and in locked arrangement; Fig. 2, a similar view of the invention just prior to automatic locking thereof; Fig. 3, a perspective detail of the invention.

A is the pump bar or rod, and B the coupling-head, of the windmill-rod, the rod A being received within the coupling.

The coupling C is of substantially U shape, one of its legs C being straight and preferably cylindrical and constituting the coupling-pin of the device, while the other leg C' may be flat, and at its end it is provided with an enlarged head D, having a lug d. The general extent of the head D and lug d is in a direction offset from the plane of the legs.

The rod A and coupling-head B are provided with registering holes for the reception of the coupling-pin C, which may be introduced in said openings from left to right, as shown in Fig. 2, until the lug d clears the rod A, whereupon the weight of the head D will cause the lug to drop by gravity in back of the pump-rod A and lock thereagainst, as shown in Fig. 1. The device will thus automatically lock itself and remain locked by gravity until released by a reversal of the above operations without necessitating the employment of any additional locking key or device whatsoever.

Having thus described my invention, what I claim as new, and desire to secure by Letters Patent, is—

1. The combination with two members, of a coupling having two legs, one of which is adapted to lock the members together and the other leg having a weighted head adapted to engage one of the members and lock the coupling.

2. The combination with two members, of a coupling having two legs, one of which is adapted to lock the members together, and the other leg having a weighted head offset from the plane of the two legs and adapted to engage one of the members and lock the coupling.

3. The combination with two members adapted to be connected together, one of said members having a socket provided with a vertical eye to receive the other member and with a horizontal opening, of a coupling-pin of substantially U shape, one leg of which is adapted to pass through said horizontal opening and through the said other member, and the other leg of which is adapted to engage with said last-mentioned member, substantially as described.

JOHN F. SCHWEIGERER.

Witnesses:
 NOAH WOLF,
 GUS A. HALL.